May 23, 1950     B. PONTECORVO     2,508,772
METHOD OF GEOPHYSICAL PROSPECTING
Original Filed Oct. 31, 1942     4 Sheets-Sheet 1

INVENTOR
Bruno Pontecorvo
BY James Y. Cleveland
ATTORNEY

INVENTOR
*Bruno Pontecorvo*
BY
*James Y. Cleveland*
ATTORNEY

Patented May 23, 1950

2,508,772

UNITED STATES PATENT OFFICE 2,508,772

METHOD OF GEOPHYSICAL PROSPECTING

Bruno Pontecorvo, Montreal, Quebec, Canada, assignor to Well Surveys, Incorporated, Tulsa, Okla., a corporation of Delaware Original application October 31, 1942, Serial No. 464,049. Divided and this application September 12, 1945, Serial No. 615,844

2 Claims. (Cl. 250—83.6)

This invention relates to geophysical prospecting and more particularly to well logging by the use of radioactive radiations.

By radioactive radiations is meant those radiations which result from the reactions of nuclear physics, particularly gamma radiation, and fast and slow neutron radiation. It is appreciated that alpha and beta radiations and positrons, protons and other types of radiations exist, as a result of nuclear reaction, and insofar as these are useful in the process to be described they are included. However, most of these other types of radiation are not sufficiently penetrating for the present purpose and hence will not be usable. Incidentally, the term radiation as here used is intended to cover both the radiation of particles such as neutrons and the radiation of quanta, as for example, gamma radiation.

It has already been suggested that geological formations, in the natural process of evolution, are continually undergoing a disintegration that produces radiations, and that these radiations may be detected by appropriate equipment, to yield measurements indicative of the nature of the formations. It has also been suggested that the disintegration of geological formations and the consequent production of radiations may be stimulated by irradiation of the formation with radiations deliberately produced for that purpose. Still further it has been suggested that the nature of geological formations may be determined by measurement of the ability of certain types of radiations to penetrate the formations, or by measurement of the ability of certain types of radiations to enter into a formation, scatter as a result of nuclear collisions within the formation and return out of the formation. Thus, several possibilities have been suggested whereby a geological structure may be irradiated with radioactive radiations and measurements made of the radiations that come from the geological formation as a result of its being irradiated. Actual tests indicate that such methods are operable and that information can be obtained in this manner as to the nature of geological formations.

The present invention is an improvement upon prior processes of determining the nature of geological formations by subjecting the formations to irradiation with radioactive radiations and measuring the returning radiations. It is applicable to such processes regardless of whether the processes depend for their operation upon the penetration of the formations by the radiations, the scattering of the radiations by the formations, or the production of secondary radiations in the formations as the result of the primary radiations.

In any event, the amount of radiation that comes from the formation and can be detected and measured, varies as the distance between the primary source of radiation and point at which said radiations are detected is varied. It has now been discovered that this variation in the intensity of returning radiations is not merely a function of the distance between the primary source of radiation and the point of detection, but is also a function of the nature of the formation. To a certain extent it is probably a function of the density of the formation, but density is not the only controlling factor, for the ability of radiations to penetrate a formation does not depend only upon density, and some types of radiation, particularly neutrons will penetrate in many cases dense formations more readily than porous ones.

For the purpose of illustrating the principles of this invention and at the same time providing workable devices for measuring this characteristic of geological strata and correlating the measurement with indications of the locations at which they were taken, several arrangements of apparatus have been devised. Since it is particularly useful to make these measurements in oil wells where the strata are not exposed for direct observation and hence can only be identified by some indirect means, the apparatus devised has all been adapted to that use. However, similar apparatus can easily be used on the surface of the earth or in any other place where it is desired to investigate the nature of geological starta by such a method.

Probably the simplest apparatus that can be used, according to the new process, for making rapid and complete well surveys, consists of a pair of ionization chambers suspended on a cable and separated a definite distance, and a source of radiation also suspended from said cable in definite spaced relation to the ionization chambers. Signals indicating the measurements made by the ionization chambers can then be carried to the surface through the cable and recorded in correlation with indications of the depth of the apparatus in the hole.

Such an apparatus can be arranged to give two curves, one for each of the ionization chambers, and a visual comparison of these two curves can be made to gain information as to variations in the nature of the formation. Alternatively, the measurements can be combined, as for example, by dividing one measurement into the other, so as to give a quotient that will itself be directly indicative of the nature of the strata.

The main difficulty with such an arrangement is that it gives information about the relative strength of radiation at only two specific distances from the primary source of radiation. While this is definitely sufficient to give worthwhile indications as to the nature of the formations, even more information can be obtained from a knowledge of the intensity of the returning radiation at a greater number of spaced points. For example, if the intensity of the radiation at every point from the source of primary radiation to a point sufficiently distant so that the intensity of the returning radiation was nil at that point, could be determined, then this information could be plotted in the form of a curve, the shape of which would be very enlightening as to the nature of the formation.

Apparatus for obtaining this information can be constructed by suspending from a cable an ionization chamber, a source of radiation, and a means for raising and lowering the source of radiation with respect to the ionization chamber. Such an apparatus is lowered into a well, the source of radiation raised or lowered with respect to the ionization chamber, the measurements made by the ionization chamber are sent to the surface, preferably through the supporting cable, and recorded. However, since it takes some time to lower the source of radiation with respect to the ionization chamber, and the apparatus must be maintained at a substantially constant depth during this time in order to obtain a set of readings for any one location, the apparatus must be operated in a step by step fashion, or at least very slowly so that no appreciable change in the nature of the formation will take place during the recording of a set of measurements. Furthermore, the difficulty of mechanically raising and lowering the source of radiation is considerable.

For this reason, it may prove desirable to use an apparatus that is a sort of compromise between the two types of apparatus mentioned. Such an apparatus may consist of a series of ionization chambers positioned at spaced points either above or below the source of radiation, and the necessary electrical circuits to simultaneously record the measurements made by each of the ionization chambers. One may thus quickly obtain a sufficient number of measurements to know the approximate form of the "decay curve" of the radiation. The term "decay curve" will hereafter be used to indicate the curve that would be formed by graphically plotting the measurements made by the ionization chambers against the distance between the ionization chambers and the primary source of radiation.

A somewhat improved arrangement upon the type of apparatus described in the preceding paragraph can be made by suspending a series of regularly spaced ionization chambers and a source of radiation, from a cable, connecting these ionization chambers to a commutator so that the measurements made by the ionization chambers will be sent one after the other in rapid succession, over the supporting cable to the surface of the earth. At the surface of the earth the signals indicative of the measurements made by the ionization chambers may be impressed upon one pair of the electrodes of a cathode ray tube and the other pair of electrodes may be controlled by an oscillator, matched in frequency to the speed of the commutator, so that the indications on the face of the cathode ray tube will directly form the decay curve mentioned above. In other words, the cathode ray tube will be controlled by the oscillator so as to scan in one direction across its face at the same speed that the commutator scans the ionization chamber connections in the well and the position of the ray in the other direction (at right angles to the direction of scanning) will be controlled by the signals indicative of the measurements. The curve so formed may be photographed by a moving picture camera. The camera may also be caused to photograph simultaneously an indicator of the depth at which the device is operating, or alternatively the motion picture camera may be driven by a device which measures the depth at which the device is operating, so that the strip of film produced may be calibrated directly in depth.

For the purpose of illustrating this invention and showing more clearly the numerous details and advantages thereof, the above mentioned types of apparatus have been diagrammatically illustrated in the drawings and will be more specifically described hereinafter.

Figure 3:
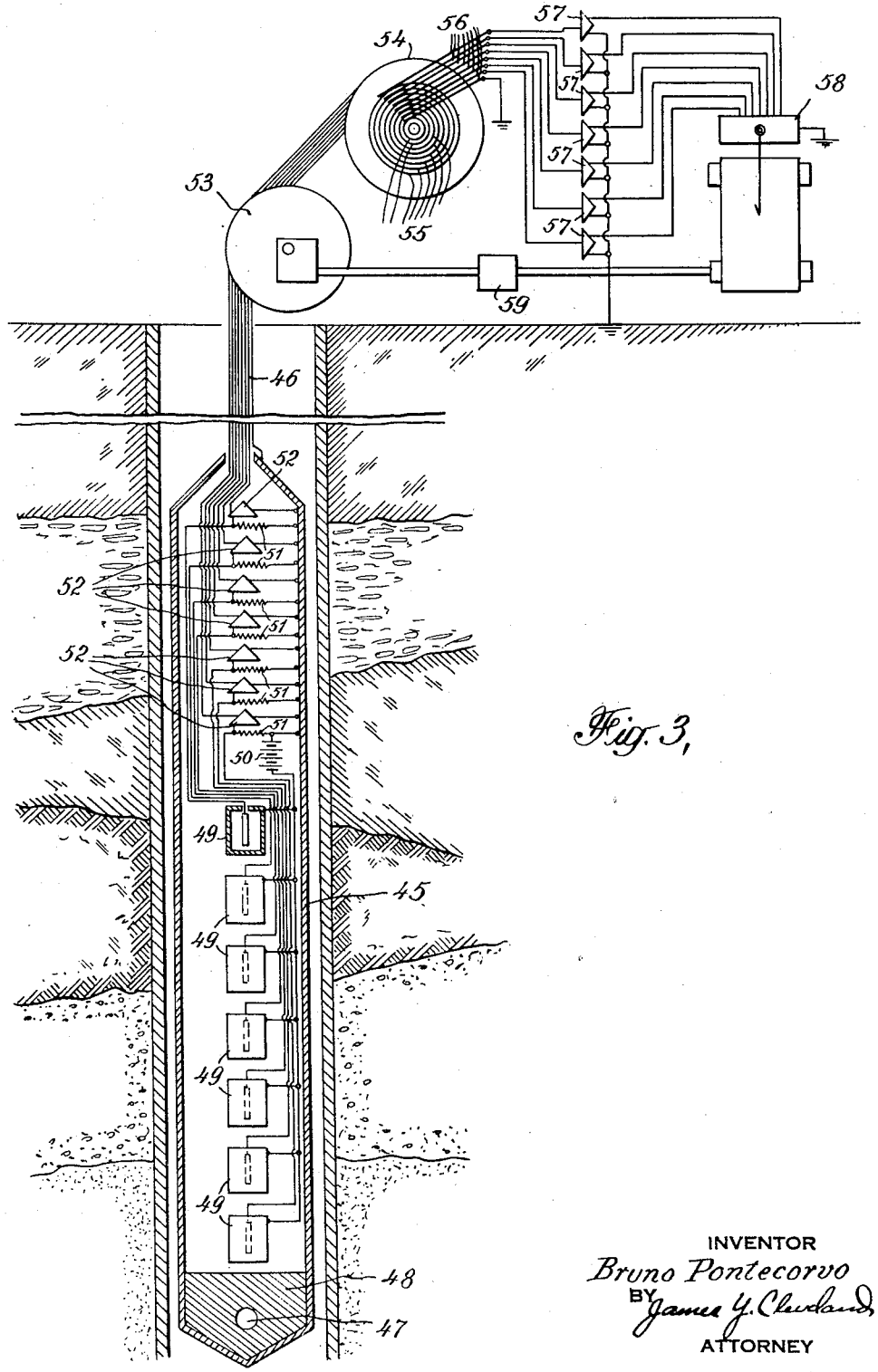
Figure 4:
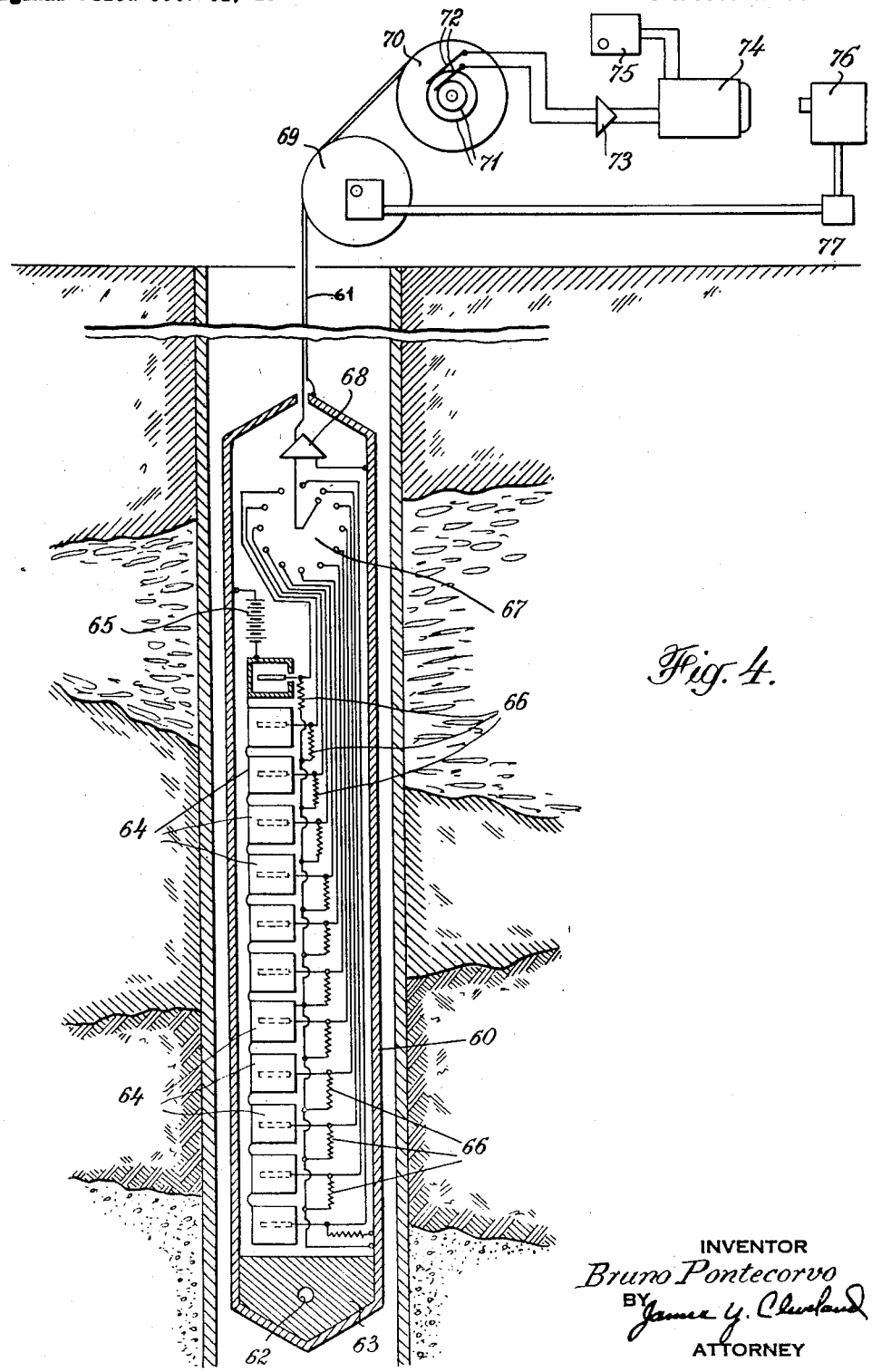

Figure 3 is a still further modification of a device for performing the method of this invention by the use of series of ionization chambers, the measurements being separately amplified and recorded; and Figure 4 is a diagrammatic illustration of a somewhat more elaborate embodiment of the principles of this invention in which the readings of a series of ionization chambers are sent sequentially to the surface of the earth and there formed into a decay curve on the face of a cathode ray tube.

Figure 1:
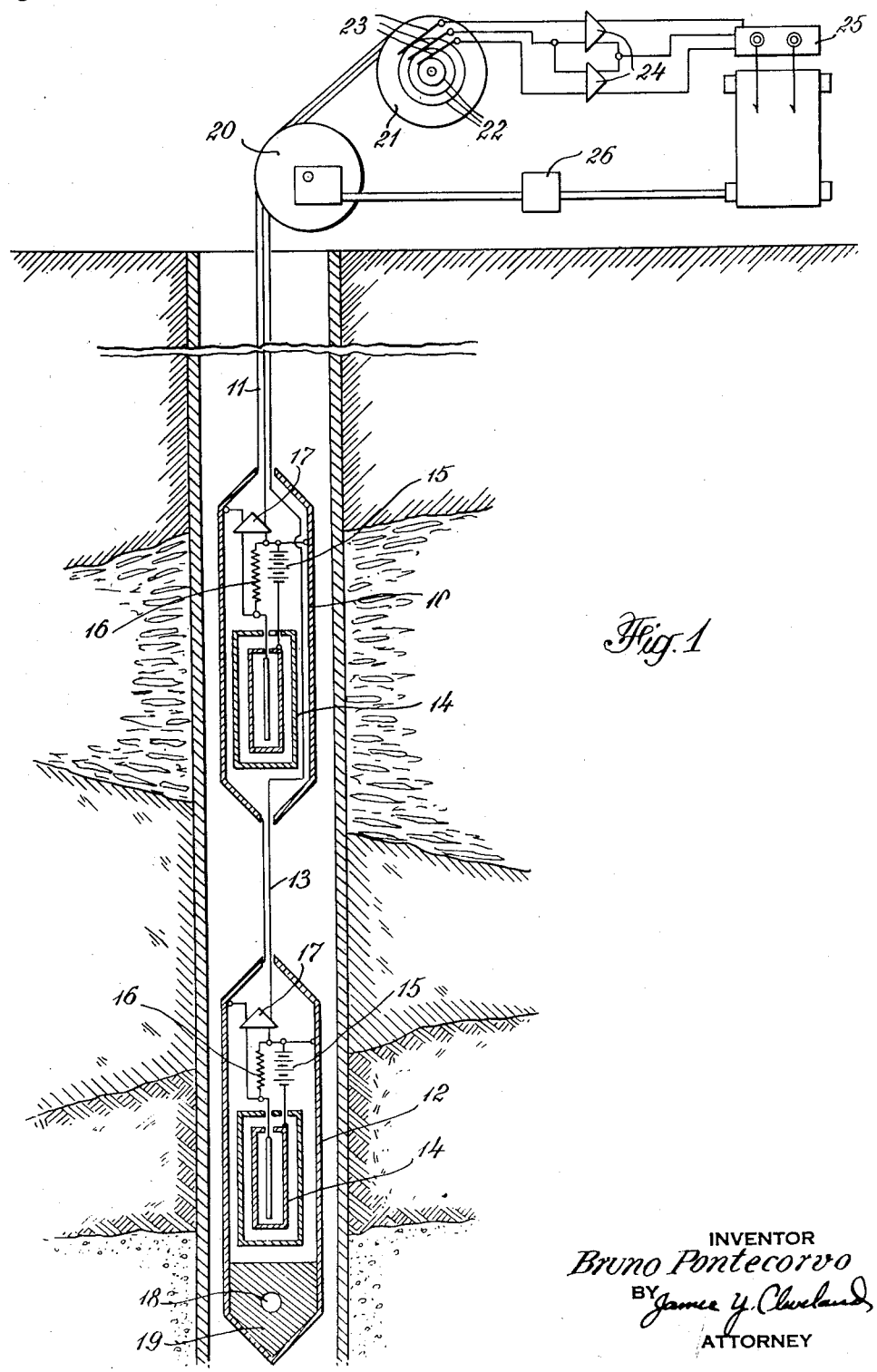
Figure 1 is a diagrammatic illustration of a relatively simple embodiment of the principles of this invention.

As illustrated in Figure 1, an apparatus embodying the principles of this invention may be constructed by supporting a measuring capsule 10 at the end of a conductor containing cable 11 and then supporting a second measuring capsule 12 from the bottom of the first measuring capsule 10 by another conductor containing cable 13.

The measuring capsules are preferably of steel or some other mechanically strong material, sealed against the entrance of well fluids and each containing an ionization chamber and an electrical circuit for operating the ionization chamber and sending signals indicative of its measurements through the conductor containing cable to the surface. For example, each measuring capsule may contain an ionization chamber 14, a battery 15, a resistor 16 and an amplifier 17. The battery and the resistor are preferably connected in series across the electrodes of the ionization chamber and the input of the amplifier is connected across the resistor.

It has been found preferable to connect the negative side of the battery to the outer electrode and ground the positive terminal of the battery to the capsule wall. One side of the output of the amplifier can also be grounded, the outer sheath of the supporting cable can be grounded, and the inner conductor or conductors can then be used in conjunction therewith to convey the signal currents to the surface of the earth. Since there is but one signal current from the lower capsule the conductor containing cable 13 need contain only one internal conductor, but since there are two signals to be conducted from the upper capsule to the surface, the conductor containing cable 11 will need to contain two insulated conductors inside the cable.

A source of primary radiation 18 may be contained in either of the two measuring capsules or suspended between, below or above the capsules. Preferably, it is contained in the lower of the two capsules and surrounded by whatever shielding 19 is desirable for the particular type of radiation being used.

This inventor's experience thus far has indicated that it is highly desirable to radiate the surrounding strata with neutrons, particularly fast neutrons, and to measure the returning gamma radiation.

For this purpose it has been found preferable to use as a source of neutrons, a mixture of radium and beryllium. Radon and beryllium, mesothorium and beryllium, mesothorium and heavy hydrogen may be used for this purpose as may also polonium mixed with elements of low atomic number. The source of neutrons is preferably surrounded by a heavy shield of lead, tungsten or other high specific gravity metal to attenuate any gamma radiation that is emitted from the source of radiations.

The ionization chambers which are to detect the returning gamma radiation are preferably filled with argon at a pressure of around 1200 pounds per square inch, the batteries used develop around 150 volts and the resistors are preferably of about $10^{11}$ ohms resistance. The use of the term "ionization chamber" is intended to mean any detector of radiations which are based on their ability, either direct or indirect, to ionize: for instance, a Geiger-Müller counter, etc.

In addition to ionization chambers specifically designed for the detection of slow neutrons by direct ionization, ionization chambers containing elements such as manganese, dysprosium, rhodium, etc., which when irradiated by neutrons will give off gamma rays that produce ionization within the chamber, can be used. When using the latter form of ionization chamber, it is necessary to conduct a point by point exploration of the drill hole, that is, each time the ionization chamber is lowered to a point in the drill hole and the element contained in the ionization chamber has been irradiated, the detector is removed and the intensity of the gamma ray emission therefrom measured as an index of the stratum.

A more complete and detailed description of a type of measuring capsule which may be used in lieu of the ones here described can be found in the application for United States Letters Patent filed by Scherbatskoy et al. on September 15, 1941, Serial No. 410,954, now Patent No. 2,376,821. A pair of such detecting units, and the attendant surface equipment shown in that application may be used, together with a source of radioactive radiation to obtain, in a somewhat more expedient manner, the results, obtainable in a somewhat cruder way by the device here diagrammatically illustrated.

At the surface the supporting cable 11 passes over a measuring wheel 20 and onto a cable drum 21 driven by a suitable source of power, not shown, to raise and lower the apparatus in the well. The signal currents are taken from the cable drum through slip rings 22 and brushes 23, pass to amplifiers 24 and from there to a multiple recorder, which separately records the measurements made by the two detectors. The recording tape of the recorder 25 may be driven from the measuring wheel 20 by any suitable means 26, such for example as a "Selsyn" electrical transmission system, so as to directly correlate the measurements made with the depth at which they are made.

As illustrated the measuring capsules are in the process of being lowered into a cased drill hole. It is to be understood however that the principles of this invention can be applied either to cased or uncased wells, for it has been found that the radiations utilized are capable of penetrating the casing and yielding desirable information. The casing, however, need not necessarily be present.

It should also be understood that the source of primary radiations may be arranged to yield either gamma radiation, fast neutrons, slow neutrons, or any combination of the three types of radiation, or conceivably, any other type of radioactive radiation capable of penetrating into the formation under observation. The ionization chambers may similarly be arranged to detect and measure any type or combination of types of radioactive radiation that returns to them. For example, the primary source of radiations, in the present arrangement is designed to emit mostly fast neutrons and the ionization chambers to be most sensitive to gamma radiation. They may, however, be shielded so that they will detect mostly gamma radiation to the practical exclusion of neutrons or so that they will detect mostly neutrons to the exclusion of gamma radiation. Still further they may be shielded or designed so that they will detect mostly slow or only fast neutrons to the exclusion of other radiation.

Methods of producing any one type of radiation or any desired combination of types of radiation are relatively well known so that they need not be discussed in detail here. It may be stated, however, that gamma radiation is produced by radioactive material, and neutrons are produced by radioactive material in the presence of such materials as beryllium, boron, lithium and the like. Gamma radiations may be filtered out of the produced radiations by heavy metals such as lead and tungsten, and slow neutrons may be filtered out of the produced radiations by such materials as boron, lithium and the like. Such materials like water and paraffin wax may be used to reduce the fast neutron intensity very efficiently.

Shielding may be used if desired to protect the ionization chambers from any types of radiation which it is not desired to detect and the ionization chambers may be made selectively sensitive to any desired type of radiation by well known methods. For example, the inclusion in the ionization chambers of boron, cadmium, lithium or the like tends to make the ionization chamber sensitive to slow neutrons whereas without these elements they tend to be sensitive to gamma rays and less sensitive to neutrons. Of course, such design factors like the pressure in the ionization chamber, dimensions of the ionization chamber, etc., are essential in this problem of detecting mostly one kind of radiation in preference to the other ones, as is well known to those skilled in the art.

Figure 2:
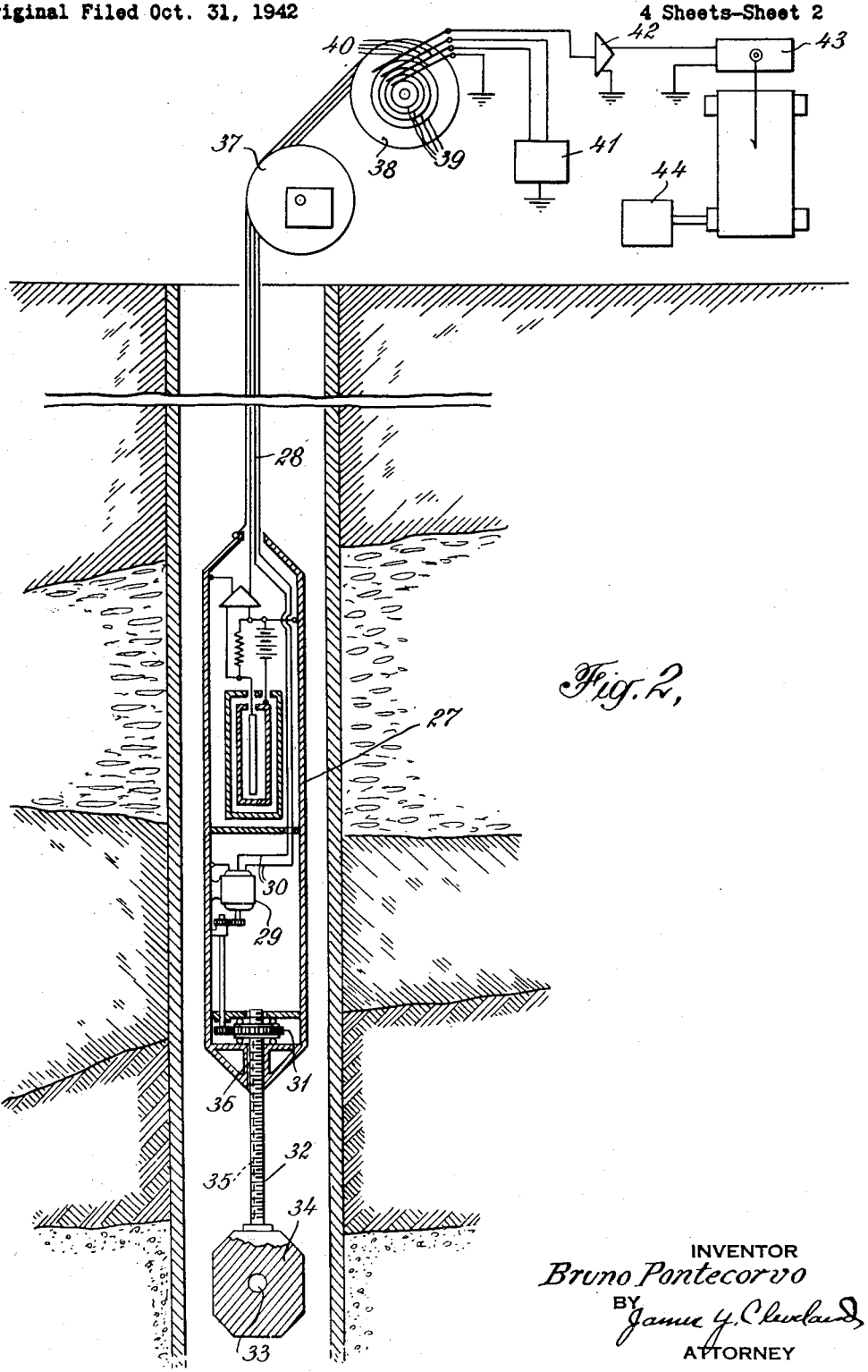
Figure 2 is a diagrammatic illustration of a modified device for performing the method of this invention by changing the relative positions of the ionization chamber and the source of radiation during the measuring operation.

The embodiment of this invention illustrated in Figure 2 is shown for the purpose of illustrating a device capable of producing a continuous decay curve at a particular location. In this device a single measuring capsule 27 is supported by a conductor containing cable 28. The upper part of this measuring capsule contains an ionization chamber, battery, resistor and amplifier just as in the case of the measuring capsule described in connection with Figure 1.

The lower part of the measuring capsule, however, is arranged to contain a reversible electrical motor 29, the operation of which is controlled by conductors 30 which extend to the surface of the earth through the supporting cable. The motor 29 is arranged to drive through suitable gearing a threaded collar 31 which is supported in the capsule and in turn supports a long screw 32 on the lower end of which is carried a source of radioactive radiation 33 surrounded, if necessary, by a suitable shield 34. The screw 32 is preferably slotted at 35 and held against rotation by a key 36 fixed in the measuring capsule 27.

At the surface the supporting cable 28 passes over the measuring wheel 37 and is wound onto a cable drum 38 driven by a suitable source of power, not shown. Connections are made through slip rings 39 and brushes 40 to a source of power 41 for the motor 29 and to an amplifier 42 for the signals from the ionization chamber. From the amplifier 42 the signal current passes to a recorder 43 the tape of which is driven by a motor or other means 44. The source of power 41 is arranged so that it can be reversed to reverse the direction of the motor 29 so that the source of radioactive material may be either raised or lowered as desired.

Since it is desirable with the device shown in this figure to make a complete curve of the measurements made versus source-detector distance, at one locality, it is not desirable to drive the tape of the recorder directly from the measuring wheel 37. Therefore the recorder tape is driven by a separate motor, and after each curve is made an indication of the depth is manually placed on the chart, or otherwise noted for future reference.

The device of Figure 2 is satisfactory for place to place measurement but cannot conveniently be used for making a continuous log. Furthermore, owing to the great pressures encountered in wells, the mechanical arrangement for raising and lowering the source of radioactive materials is somewhat difficult to construct. Therefore the device of Figure 3 will often be found more advantageous, although it is in actuality a sort of compromise between the device of Figure 1 and the device of Figure 2.

In the device shown in Figure 3, a single, but quite long measuring capsule 45 is supported in the lower end of a multiconductor cable 46. This measuring capsule contains at its lower end a source of radioactive radiations 47 enclosed, if necessary, in a suitable shield 48, and above the source of radioactive radiations a whole series of, preferably equally spaced, ionization chambers 49. Each of these ionization chambers 49 is connected to a battery 50 and a resistor 51, the arrangement being such that one battery will suffice for the whole group of ionization chambers but that a different resistor 51 is provided for each ionization chamber. An amplifier 52 is also provided for each ionization chamber and an output connection for each amplifier carried in the multiconductor cable 46 so that the signals from each ionization chamber are separately carried to the surface of the earth. As can be seen, one side of each of the amplifiers is grounded so that the multiconductor cable need contain only one insulated conductor for each of the several amplifiers.

At the surface the multiconductor cable 46 passes over a measuring wheel 53 and is wound onto a cable drum 54 driven by a suitable source of power, not shown. Signal currents are taken from the cable drum through slip rings 55 and brushes 56 as before, separately amplified by a series of amplifiers 57 and recorded by a recorder 58 which is preferably of the type which records, sequentially, one indication after the other in relatively rapid succession so as to form a whole series of continuous records. The "Speedomax" recorder manufactured by the Leeds & Northrup Company is such a recorder. The tape of this recorder is preferably driven from the measuring wheel 53 through an electrical transmission system such as the well known "Selsyn" transmission system 59.

The result of using a device of the type shown in Figure 3 is to produce a whole series of curves each showing the intensity of the detected radiations at a different distance from the source of radiation. From this information a fairly accurate decay curve can be constructed for any particular locality or series of localities.

The device of Figure 4 has been designed for the purpose of reproducing the decay curve more directly and also for the purpose of simplifying the transmission of the results from the measuring capsule to the surface. In the device of Figure 3 it is necessary to have a cable containing a large number of insulated conductors. This is difficult in accomplishment because of the extreme pressure and temperature conditions encountered in wells and the necessity of including a large number of separate conductors each insulated from all of the others.

As illustrated in Figure 4 a measuring capsule 60 is suspended in the well by means of a supporting cable 61 which contains, in addition to the cable itself only one insulated conductor. In the measuring capsule is a source of radioactive radiation 62 surrounded by a suitable shield 63, a whole series of spaced ionization chambers 64, a battery 65 and a resistor 66 for each ionization chamber, just as in Figure 3. Instead, however, of having an amplifier for each ionization chamber, the connections from the ionization chambers all extend to a commutator 67 which is suitably driven at a constant speed by a power source, not shown, so that the connections are, one after the other, in sequence, connected to the input of an amplifier 68. The output of the amplifier 68 is connected through the cable to the surface.

As a result of this arrangement the signals coming to the surface represent the measurements of one after the other of the ionization chambers, in rapid sequence, and this sequence repeats itself constantly. The driving means for the commutator is preferably a constant speed spring or electric motor so that the timing of the sequence is regular.

At the surface the supporting cable passes over a measuring wheel 69 and is received on a cable drum 70 driven by suitable source of power, not shown, as in the preceding figures. The signal current is taken from the cable drum by means of slip rings 71 and brushes 72, amplified by an amplifier 73 and impressed upon one pair of electrodes of a cathode ray tube 74.

A variable frequency oscillator 75 supplies current to the other pair of electrodes of the cathode ray tube and by varying the frequency of the oscillator until its frequency matches that of the commutating device 67, there will be established on the face of the cathode ray tube a curve representing the decay curve of the returning radiation, that is the curve will be a graph of source-detector distance versus the strength of the returning radiation.

This curve may be continually photographed by a moving picture camera 76, which may in turn be driven from the measuring wheel 69 by any suitable transmission system, such for example as the "Selsyn" electrical transmission system 77. In this case the camera will be arranged to take pictures at regular intervals of depth, and is preferably so arranged that the exposure for the pictures will be held constant even though the speed, that is the interval between taking, may be varied to compensate for the speed of lowering or raising the measuring capsule in the well.

Alternatively, the motion picture camera may be driven at a constant rate and an indicator driven by the measuring wheel, which indicator is positioned within range of the lens of the camera so that it will be constantly photographed along with the curve on the face of the cathode ray tube. In this way, when the picture taken by the camera is developed, printed and projected or viewed, it will be possible for the observer to note the shape of the curve and its changes and at the same time ascertain the depth at which the curve was made.

It will be obvious to those skilled in the art that numerous modifications, other than those herein disclosed can be made without departing from the scope or spirit of this invention.

I claim:

1. A method of geophysical prospecting that comprises irradiating formations surrounding a drill hole about which information is desired with radioactive radiation, measuring radiation that returns from said formation, at a series of spaced points that differ in their distances from the source of radiation by regularly spaced intervals, sequentially selecting signals indicative of measurements made at the different points, and graphically representing said sequentially selected signals in correlation with the distances between source and detectors for selected depths of the source in the drill hole to form a continuous curve graphically representative of the decay in intensity of the returning radiation as the distance from the primary source of radiation increases.

2. The process as defined in claim 1 further characterized in that the irradiation and measurements are performed in a well bore, continuously, the location of the source of radiation and the points of measurement are continuously changed with respect to the well bore but not with respect to each other, and correlating the measurements with the depth at which the radiation is detected.

BRUNO PONTECORVO.

REFERENCES CITED

The following references are of record in the file of this patent:

UNITED STATES PATENTS

| Number | Name | Date |
| --- | --- | --- |
| 2,186,268 | Pakala | Jan. 9, 1940 |
| 2,220,509 | Brons | Nov. 5, 1940 |
| 2,284,345 | Schlesman | May 26, 1942 |
| 2,289,926 | Neufeld | July 14, 1942 |
| 2,295,738 | Gillbergh | Sept. 15, 1942 |
| 2,296,176 | Neufeld | Sept. 15, 1942 |
| 2,382,609 | Dale | Aug. 14, 1945 |
| 2,390,433 | Fearon | Dec. 4, 1945 |